US012399849B2

(12) United States Patent
Luo et al.

(10) Patent No.: US 12,399,849 B2
(45) Date of Patent: Aug. 26, 2025

(54) DATA PROCESSING METHODS, APPARATUSES, ELECTRONIC DEVICES AND COMPUTER-READABLE STORAGE MEDIA

(71) Applicant: Stream Computing Inc., Beijing (CN)

(72) Inventors: Fei Luo, Beijing (CN); Weiwei Wang, Beijing (CN)

(73) Assignee: Stream Computing Inc., Beijing (CN)

( * ) Notice: Subject to any disclaimer, the term of this patent is extended or adjusted under 35 U.S.C. 154(b) by 646 days.

(21) Appl. No.: 17/726,187

(22) Filed: Apr. 21, 2022

(65) Prior Publication Data
US 2022/0269622 A1 Aug. 25, 2022

Related U.S. Application Data

(63) Continuation of application No. PCT/CN2019/113061, filed on Oct. 24, 2019.

(51) Int. Cl.
*G06F 9/48* (2006.01)
*G06F 13/16* (2006.01)

(52) U.S. Cl.
CPC ......... *G06F 13/1689* (2013.01); *G06F 9/485* (2013.01); *G06F 9/4881* (2013.01); *G06F 13/1657* (2013.01)

(58) Field of Classification Search
CPC .... G06F 13/1689; G06F 9/485; G06F 9/4881; G06F 13/1657
See application file for complete search history.

(56) References Cited

U.S. PATENT DOCUMENTS 5,655,132 A * 8/1997 Watson ............... G06F 9/462
712/E9.023
2003/0084269 A1* 5/2003 Drysdale ............. G06F 9/544
712/36

(Continued)

FOREIGN PATENT DOCUMENTS

CN 104238997 A 12/2014
CN 105589829 A 5/2016
(Continued)

OTHER PUBLICATIONS

International Search Report for PCT Application No. PCT/CN2019/1133061, mailed Jul. 24, 2020.
(Continued)

*Primary Examiner* — April Y Blair
*Assistant Examiner* — Jonathan R Labud
(74) *Attorney, Agent, or Firm* — Andrus Intellectual Property Law, LLP

(57) ABSTRACT

Embodiments of the present disclosure provide a data processing method, apparatus, electronic device and computer-readable storage medium. The data processing method includes: receiving, by a processing core, a synchronization signal; determining, by the processing core, according to the synchronization signal, a first storage area used by a self-task of the processing core and a second storage area used by a non-self-task of the processing core; wherein the first storage area differs from the second storage area; accessing the first storage area to execute the self-task and accessing the second storage area to execute the non-self-task by the processing core. Through the above method, the storage areas corresponding to different tasks of the processing core are separated, which solves the technical problems of complex data consistency processing mechanism and low pro- (Continued)

cessing efficiency caused by reading from and writing into the same storage area in the existing technology.

4 Claims, 5 Drawing Sheets

(56) References Cited

U.S. PATENT DOCUMENTS

| | | | | |
|---|---|---|---|---|
| 2005/0108711 | A1* | 5/2005 | Arnold | G06F 9/3851 |
| | | | | 712/E9.032 |
| 2007/0094462 | A1* | 4/2007 | Hill | G06F 13/18 |
| | | | | 711/158 |
| 2013/0239122 | A1 | 9/2013 | Sandstrom | |
| 2014/0196050 | A1* | 7/2014 | Yu | G06F 9/5094 |
| | | | | 718/104 |
| 2015/0312331 | A1* | 10/2015 | Crocker | G06F 15/167 |
| | | | | 709/205 |
| 2018/0276051 | A1* | 9/2018 | Wen | G06F 9/3889 |
| 2018/0307974 | A1* | 10/2018 | Fang | G06N 3/08 |
| 2019/0155768 | A1 | 5/2019 | Wilkinson et al. | |

FOREIGN PATENT DOCUMENTS

| | | |
|---|---|---|
| CN | 107980118 A | 5/2018 |
| CN | 110209509 A | 9/2019 |

OTHER PUBLICATIONS

Extended European Search Report for European Patent Application No. EP19949761.1, dated Nov. 14, 2022.

\* cited by examiner

DATA PROCESSING METHODS, APPARATUSES, ELECTRONIC DEVICES AND COMPUTER-READABLE STORAGE MEDIA

CROSS-REFERENCE TO RELATED APPLICATION

This application is a continuation application of International Patent Application No. PCT/CN2019/113061, filed on Oct. 24, 2019, the entire contents of which are incorporated herein by reference for all purposes.

TECHNICAL FIELD

The disclosure relates to the field of neural network computing, and in particular, to a data processing method, apparatus, electronic device, and computer-readable storage medium.

BACKGROUND

With the development of science and technology, human society is rapidly entering an era of intelligence. The important feature of the era of intelligence is that people may acquire more and more types of data, the amount of data that people may acquire is becoming larger and larger, and the demand for the data processing speed is becoming higher and higher.

Chips are the cornerstone of data processing, which essentially determine the ability to process data. From the perspective of application fields, the chips are mainly developed in two routes. One is general-purpose chips, for example, central processing units (CPU) and the like, which can provide great flexibility but have low effective computing power when processing algorithms in a specific field; the other is special-purpose chips, for example, tensor processing units (TPU) and the like, which have high effective computing power in certain specific fields but are poor in processing capacity or even have no processing capacity in flexible and universal fields.

Due to various data types and numerous data volumes in the era of intelligence, the chips are required to not only process changing algorithms in different fields with extremely high flexibility, but also rapidly process a great number of dramatically increasing data volumes with extremely strong processing capacities.

SUMMARY

The summary is provided to introduce concepts in a brief form, which will be described in detail in the Detailed Description that follows. The summary is not intended to identify key features or essential features of the claimed technical solution, nor is it intended to be used to limit the scope of the claimed technical solution. In order to solve the problems of complex data consistency processing mechanism and low processing efficiency when dealing with the data consistency problem in data exchange between multiple cores in the existing technology, the embodiments of the present disclosure provide the following data processing methods, devices, electronic devices and computer-readable storage media.

In a first aspect, the embodiments of the present disclosure provide a data processing method, including:
receiving, by a processing core, a synchronization signal;
determining, by the processing core, according to the synchronization signal, a first storage area used by a self-task of the processing core and a second storage area used by a non-self-task of the processing core;
wherein the first storage area differs from the second storage area;
accessing the first storage area to execute the self-task and accessing the second storage area to execute the non-self-task by the processing core.

Through the above solution, in each synchronization signal, the storage areas corresponding to different types of tasks of the processing core are separated, so that multiple tasks of the processing core may read from and write into different storage areas in parallel, without the need for complex data consistency processing mechanism, improving the efficiency of processing cores.

Further, the first storage area includes a plurality of first memories; the self-task includes a computational task and a sending task; and the computational task and the sending task use a same first memory, or the computational task and the sending task use different first memories.

Further, the self-task includes a plurality of the sending tasks, wherein each of the sending tasks corresponds to a different or same target processing core, and each of the sending tasks is marked with a storage area of the target processing core.

Further, the second storage area includes a plurality of second memories; the non-self-task includes at least one receiving task, wherein different receiving tasks use different second memories.

Further, different receiving tasks correspond to different source processing cores or a same source processing core.

Further, before the processing core receives the synchronization signal,
the processing core receives configuration information, the configuration information including, in a synchronization cycle determined by each synchronization signal, a task of the processing core and a storage area corresponding to the task.

In a second aspect, the embodiments of the present disclosure provide a data processing method, including:
receiving, by a processing core, a synchronization signal;
executing, by the processing core, a computational task and a receiving task in a synchronization cycle determined by the synchronization signal, wherein data of the receiving task is from a source processing core;
accessing, by the processing core, a first storage area to execute the computational task;
receiving the data transmitted from the source processing core and writing the data into a second storage area by the processing core;
wherein the first storage area differs from the second storage area.

Further, the data of the receiving task is from a plurality of the source processing cores, and the processing core has a plurality of second storage areas corresponding to different source processing cores or a same source processing core.

In a third aspect, the embodiments of the present disclosure provide a data processing apparatus, including:
a synchronization signal receiver used by a processing core to receive a synchronization signal;
a storage area determiner used by the processing core to determine a first storage area used by a self-task of the processing core and a second storage area used by a non-self-task of the processing core, according to the synchronization signal;

wherein the first storage area differs from the second storage area;
a task executor used by the processing core to access the first storage area to execute the self-task and access the second storage area to execute the non-self-task.

Further, the first storage area includes a plurality of first memories; the self-task includes a computational task and a sending task; and the computational task and the sending task use a same first memory, or the computational task and the sending task use different first memories.

Further, the self-task includes a plurality of the sending tasks, wherein each of the sending tasks corresponds to a different or same target processing core, and each of the sending tasks is marked with a storage area of the target processing core.

Further, the second storage area includes a plurality of second memories; the non-self-task includes at least one receiving task, wherein different receiving tasks use different second memories.

Further, different receiving tasks correspond to different source processing cores or a same source processing core.

Further, the data processing apparatus further includes:
a configuration information receiver used by the processing core to receive configuration information, the configuration information including, in a synchronization cycle determined by each synchronization signal, a task of the processing core and a storage area corresponding to the task.

In a fourth aspect, the embodiments of the present disclosure provide a data processing apparatus, including:
a synchronization signal receiver used by a processing core to receive a synchronization signal;
a task determiner used by the processing core to execute a computational task and a receiving task in a synchronization cycle determined by the synchronization signal, wherein data of the receiving task is from a source processing core;
a computational task executor used by the processing core to access a first storage area to execute the computational task;
a receiving task executor used by the processing core to receive the data transmitted from the source processing core and write the data into a second storage area;
wherein the first storage area differs from the second storage area.

Further, the data of the receiving task is from a plurality of the source processing cores, and the processing core has a plurality of second storage areas corresponding to different source processing cores or a same source processing core.

In a fifth aspect, the embodiments of the present disclosure provide an electronic device, including: a memory storing computer-readable instructions; and one or more processors configured to execute the computer-readable instructions, which, upon execution, cause the processors to implement any one of the data processing methods in the first aspect.

In a sixth aspect, the embodiments of the present disclosure provide a non-transitory computer-readable storage medium, the non-transitory computer-readable storage medium storing computer-readable instructions that cause a computer to execute any one of the data processing methods in the first aspect.

In a seventh aspect, the embodiments of the present disclosure provide a computer program product, wherein the program includes computer-readable instructions that implement any one of the data processing methods in the first aspect, when the program is executed on a computer.

The embodiments of the present disclosure provide a data processing method, apparatus, electronic device and computer-readable storage medium. The data processing method includes: receiving, by a processing core, a synchronization signal; determining, by the processing core, according to the synchronization signal, a first storage area used by a self-task of the processing core and a second storage area used by a non-self-task of the processing core; wherein the first storage area differs from the second storage area; accessing the first storage area to execute the self-task and accessing the second storage area to execute the non-self-task by the processing core. Through the above method, the storage areas corresponding to different tasks of the processing core are separated, which solves the technical problems of complex data consistency processing mechanism and low processing efficiency caused by reading from and writing into the same storage area in the existing technology.

The above description is only an overview of the technical solutions of the present disclosure. For a clearer understanding of the technical means of the present disclosure for implementation according to the content of the specification, and to make the above and other objectives, features, and advantages of the present disclosure clearer and more comprehensible, detailed description is provided as follows with reference to preferred embodiments and accompanying drawings.

BRIEF DESCRIPTION OF THE DRAWINGS

The above and other features, advantages, and aspects of embodiments of the present disclosure will become more apparent in conjunction with the accompanying drawings and with reference to the following specific embodiments. Throughout the accompanying drawings, the same or similar reference numerals represent the same or similar elements. It should be understood that the accompanying drawings are schematic and that the originals and elements are not necessarily drawn to scale.

DETAILED DESCRIPTION

Figure 1A:
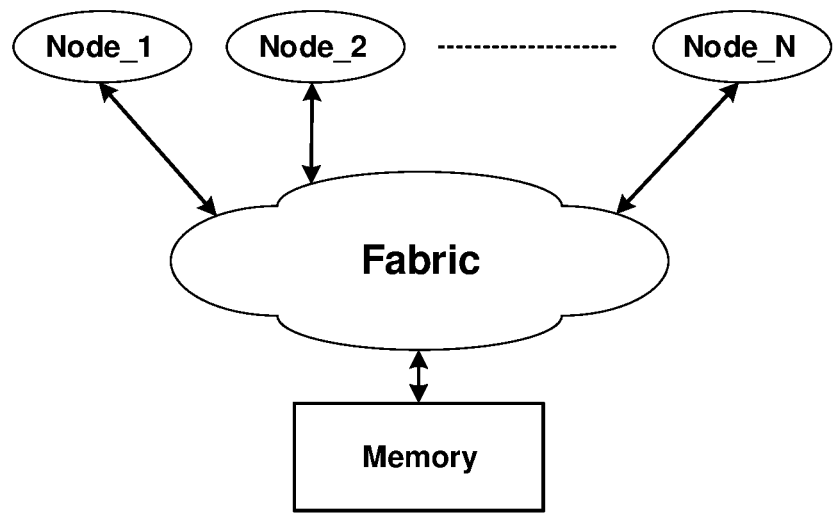
FIG. 1a-FIG. 1c are schematic diagrams of background technology of the present disclosure.

Embodiments of the present disclosure will be described in greater detail below with reference to the accompanying drawings. While some embodiments of the present disclosure are shown in the accompanying drawings, it should be understood that the present disclosure may be implemented in various forms and should not be construed as being limited to the embodiments set forth herein, instead these embodiments are provided for a more thorough and complete understanding of the present disclosure. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in a different order, and/or in parallel. In addition, the method embodiments may include additional steps and/or omit the steps illustrated. The scope of the present disclosure is not limited in this regard.

The term "include" and its variations are used herein as an open inclusion, that is, "including, but not limited to". The term "based on" means "based, at least in part, on". The term "an embodiment" means "at least one embodiment". The term "another embodiment" means "at least one additional embodiment". The term "some embodiments" means "at least some embodiments". Relevant definitions of other terms will be given in the descriptions below.

It should be noted that the concepts such as "first" and "second" mentioned in the present disclosure are used only to distinguish between different apparatuses, modules or units, and are not intended to define the order or mutual interdependence of the functions performed by these apparatuses, modules or units. The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another. A unit or module may be implemented purely by software, purely by hardware, or by a combination of hardware and software. In a pure software implementation, for example, the unit or module may include functionally related code blocks or software components, that are directly or indirectly linked together, so as to perform a particular function. For example, a "synchronization signal receiving module" may also be referred to as a "a synchronization signal receiver".

It should be noted that the modifications of "one", "a" and "plurality of" referred to in the present disclosure are illustrative rather than limiting, and it should be understood by those skilled in the art to mean "one or more" unless the context clearly indicates otherwise.

The names of messages or information exchanged between the plurality of apparatuses in the embodiments of the present disclosure are used for illustrative purposes only and are not intended to limit the scope of the messages or information.

A multi-core structure in the existing technology is shown in FIG. 1a. In a multi-core structure (such as SMP, Symmetric Multi-Processor), there are generally two ways of data transmission among cores.

Figure 1B:
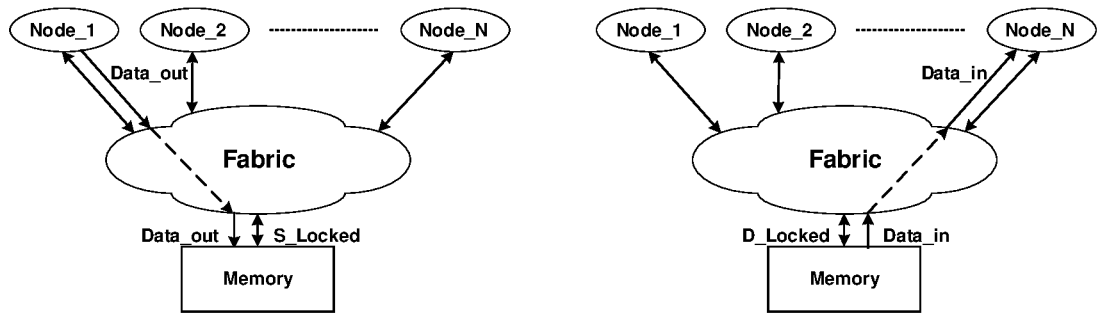

Scheme 1: Data is transmitted through the shared memory. The sending core writes the data into the shared memory, and then the receiving core reads the shared memory to retrieve the data. The process is shown in FIG. 1b. Scheme 1 has the following disadvantages: the processing mechanism for data consistency is complex, and the sequence of tasks run by the sending core and receiving core needs to be specially arranged, for example, the time for the receiving core to read the data cannot be earlier than the time for the sending core to write the data; special circuits are needed to ensure data consistency, such as adding storage locks. When the sending core writes data into the shared memory, the memory is locked by the lock signal S_Locked, and no other core can operate the shared memory. When the receiving core reads data from the shared memory, the shared memory is locked by the lock signal D_Locked, and no other core can operate the shared memory. A special program is required to deal with data consistency. For example, before the receiving core reads data, it is required to check whether the shared memory is locked. The data can only be read when the shared memory is not locked. The data needs to be transferred once in the shared memory, and requires one more read and write operation.

Figure 1C:
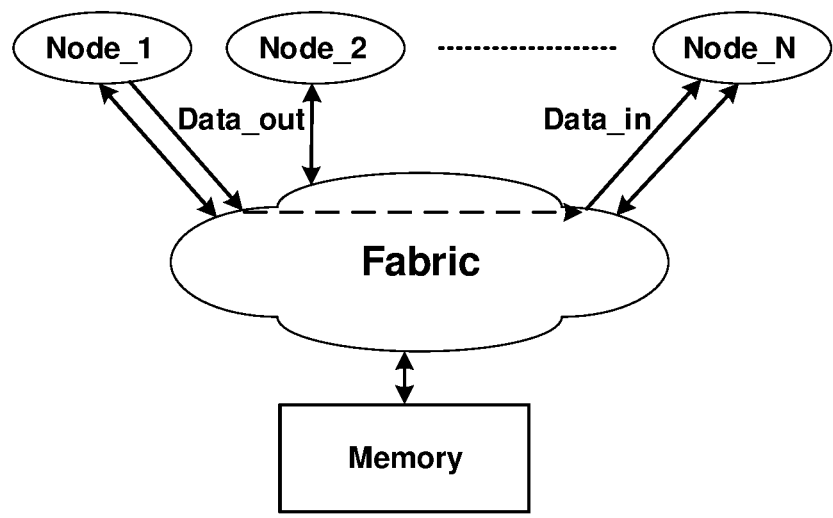

Existing scheme 2: The sending core sends data to the mailbox of the receiving core, and the mailbox of the receiving core is a fixed storage area in the receiving core, which can receive information from different sending cores. The process is shown in FIG. 1c. Scheme 2 has the following disadvantages: the size of the mailbox is limited, which limits the size of the data sent by the sending core; when the task processing speeds of the receiving core and the sending core are inconsistent, the core with fast processing speed needs to wait for the core with slow processing speed, which affects the overall performance of the entire multi-core system; to receive the data of the sending core, the receiving core needs to interrupt the program being executed to process the received data, thereby reducing the processing efficiency of the receiving core.

It can be seen from the above two schemes that when dealing with the data consistency problem in data exchange between multiple cores in the existing technology, there are problems of complex processing mechanism for data consistency and low processing efficiency.

Figure 2:
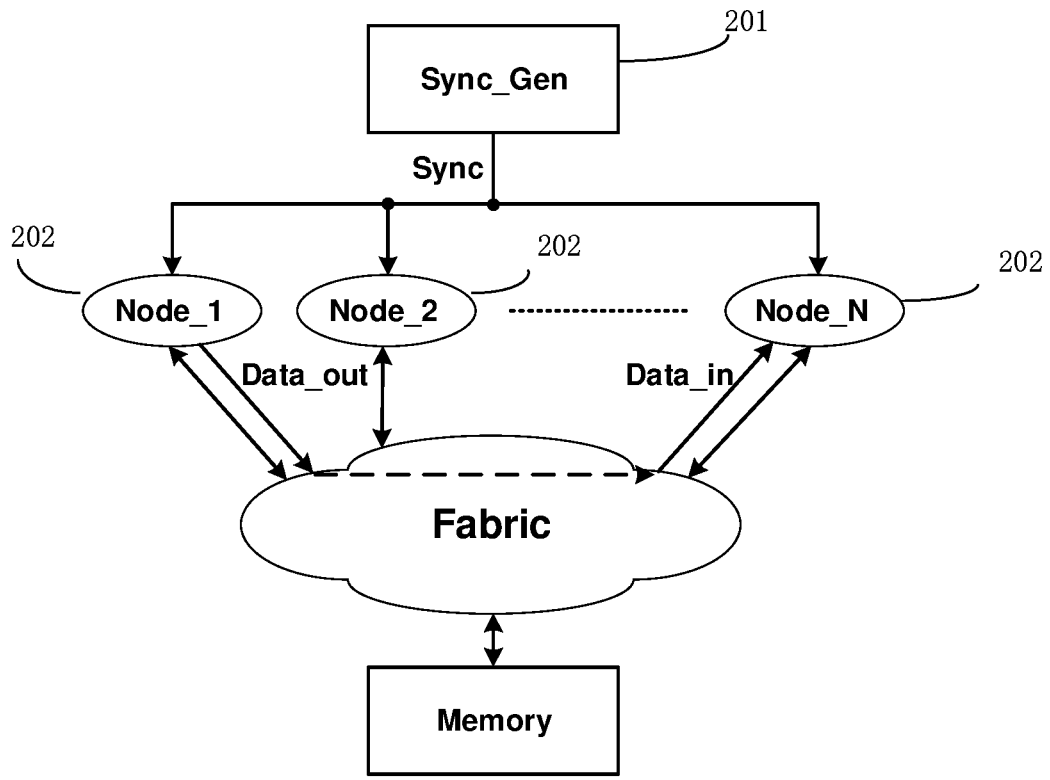
FIG. 2 is a schematic diagram of an application scenario of the present disclosure.

FIG. 2 is a schematic diagram of an application scenario of an embodiment of the present disclosure. As shown in FIG. 2, a synchronization signal generator 201 generates a synchronization signal Sync to multiple processing cores 202; after receiving the Sync, the multiple processing cores 202 enter the superstep determined by the Sync signal and start to process the respective tasks of the multiple processing cores. After all the processing cores complete the respective tasks of their own cores, the synchronization signal generator 201 generates a new synchronization signal Sync to cause the multiple processing cores to enter a new superstep to complete new tasks.

Figure 3:
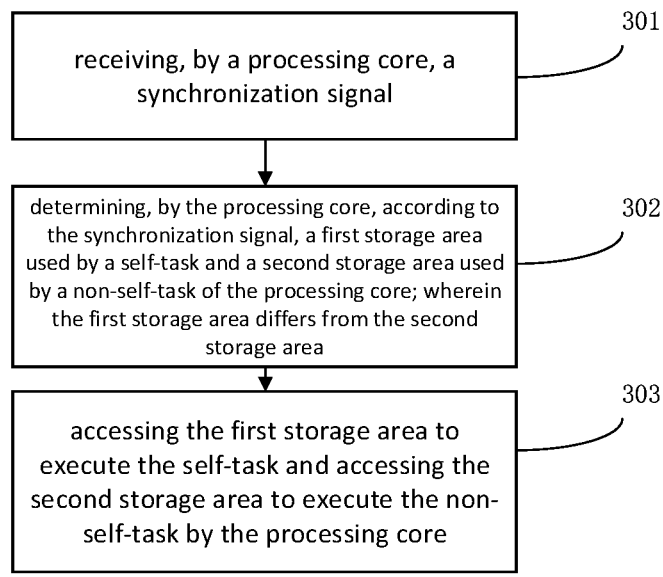
FIG. 3 is a schematic flowchart of an embodiment of a data processing method provided by the present disclosure.

FIG. 3 is a flowchart of an embodiment of a data processing method according to an embodiment of the present disclosure. The data processing method according to the embodiment may be executed by any one of the processing cores in a multi-core processor. Alternatively, the data processing method may be performed by a data processing apparatus. The data processing apparatus may be implemented as software, or implemented as a combination of software and hardware, and the data processing apparatus may be integrated in a certain device of a data processing system, such as in a data processing server or a data processing terminal device. As shown in FIG. 3, the method includes the following steps:

Step S301, a processing core receives a synchronization signal;

The technical solution of the present disclosure is used in multi-core structure systems using BSP (Bulk Synchronous Parallel) synchronization mechanism. The BSP synchronization mechanism is that all processing cores in the multi-core system are synchronized by a synchronization signal, the time between two synchronization signals is called a superstep, and each processing core processes each task of the processing core in the duration of a superstep. In the step S301, a processing core receives the synchronization signal generated by the synchronization signal generator 201, which indicates that the processing core can process a new task.

Step S302, the processing core determines, according to the synchronization signal, a first storage area used by a self-task of the processing core and a second storage area used by a non-self-task of the processing core;

In this step, when the synchronization signal is determined, the first storage area used by the self-task and the second storage area used by the non-self-task in the synchronization cycle determined by the synchronization signal are determined.

It should be noted that in the synchronization cycle determined by the next synchronization signal, the corresponding relationship between self-tasks and non-self-tasks of the processing core and the storage areas may change. For example, the self-task uses the second storage area, and the non-self-task uses the first storage area. The storage areas used by the self-tasks and non-self-tasks in the processing core are adjusted according to different synchronization signals.

In the present disclosure, the first storage area differs from the second storage area. The first storage area differing from the second storage area refers to that the reading and writing of the first storage area and the reading and writing of the second storage area are independent of each other. For example, the first storage area and the second storage area are two memories or two groups of memories physically separated.

In the present disclosure, the synchronization signal has a predetermined sequence or parameter, and the sequence or parameter may uniquely determine a synchronization signal. For example, a complete task needs to be completed within n synchronization cycles. The complete task is divided into multiple subtasks, and each subtask is assigned to one or more processing cores for execution. It is predetermined that a subtask is completed by which processing core or cores in a superstep determined by which synchronization signal. Therefore, in this step, the processing core can uniquely determine a synchronization signal according to the sequence or parameter of the synchronization signal, and can determine the self-task through the synchronization signal. Since the tasks are predetermined, the storage areas used by the tasks can be predetermined.

Optionally, the first storage area includes a plurality of first memories; the self-task includes a computational task and a sending task; and the computational task and the sending task use a same first memory, or the computational task and the sending task use different first memories. The computational task is that the processing core obtains the data to be computed from the first storage area, performs computation on the data to obtain a computational result, and stores the computational result in the first storage area; the sending task is that the processing core obtains the data to be sent from the first storage area, and sends the data to be sent to a target processing core according to the target processing core and the storage area of the target processing core that are pointed to by the sending task. The computational task and the sending task may use a same first memory. For example, the processing core executes the computational task and stores the computational task result in the first memory, and then sends the computational result to the target processing core; at this time, the computational task and the sending task use the same first memory. Alternatively, the computational task and the sending task use different first memories; at this time, the data sent by the sending task is not related to the data used by the computational task, and the two are stored in different first memories and can be processed in parallel.

Optionally, the self-task includes a plurality of sending tasks, wherein each of the sending tasks corresponds to a different or same target processing core, and each of the sending tasks is marked with a storage area of the target processing core. For example, there are three sending tasks with the respective target processing cores C1, C2 and C3. A sending task is marked with a storage area in the target processing core, indicating that in which storage area of the target processing core the data sent by the sending task needs to be stored; for example, being marked with the target processing core C1, the second storage area with ID equal to 1 indicates that the data sent to the target processing core C1 needs to be stored in a first one of memories of the second storage area in the target processing core C1. The mark may also be a specific storage address of the storage area.

Optionally, the second storage area includes a plurality of second memories; the non-self-task includes at least one receiving task, wherein different receiving tasks use different second memories. In this optional embodiment, the second storage area is for storing data sent by the source processing core. The processing core includes a receiving circuit, configured to receive the data sent by the source processing core, and store the data sent by the source processing core, according to an address in the receiving task, to a second memory indicated by the address. Different receiving tasks use different second memories. That is, in a superstep, the receiving tasks of the processing core are determined and the second memories corresponding to the receiving tasks are also determined.

In this step, according to the predetermined tasks of the processing core and the storage areas corresponding to these tasks, the storage area used by the self-task of the processing core can be isolated from the storage area used by the non-self-task of the processing core, so as to maintain data consistency.

Step S303, the processing core accesses the first storage area to execute the self-task, and accesses the second storage area to execute the non-self-task.

After the storage area used by the task of the processing core is determined in step S302, the process core accesses the storage areas to execute corresponding tasks. For example, the processing core is required to complete three subtasks in the superstep determined by the synchronization signal. The subtasks are as follows: acquiring computational data from a first memory of a first storage area in the processing core, performing computation and storing back in the first memory of the first storage area; acquiring sending data from a second memory of the first storage area in the processing core, and sending it to a third memory of a first storage area in the target processing core C2; receiving data from the source processing core C3 and storing it in a first memory of a second storage area of the processing core. When the processing core is executing the above subtasks, since the storage areas and the memories of the storage areas are physically independent of each other, there is no problem of data inconsistency, and no special circuit is required to ensure data consistency.

Optionally, before the step S301, step S3001 may be included: the processing core receives configuration information, the configuration information including, in a synchronization cycle determined by each synchronization signal, a task of the processing core and a storage area corresponding to the task.

In this step, the process core receives configuration information, the configuration information including, in a synchronization cycle determined by each synchronization signal, tasks of the processing core and a storage area corresponding to each task. The configuration information is generated by the upper-level program, which divides a complete task into multiple subtasks, and the subtasks that can be completed in parallel are assigned to be completed in the same synchronization cycle. For example, a convolutional neural network includes multiple neural nodes, and the tasks performed by the neural nodes on the same layer are assigned to multiple processing cores for processing in the same synchronization cycle (assuming there are enough processing cores), then the number of synchronization cycles required is the same as the layers of neural networks. In this way, in each synchronization cycle, the tasks processed by each processing core are predetermined, and each task can be assigned a storage area in advance, so that the storage area does not need to be shared among multiple tasks, and thus data inconsistency problem is not generated.

Figure 4:
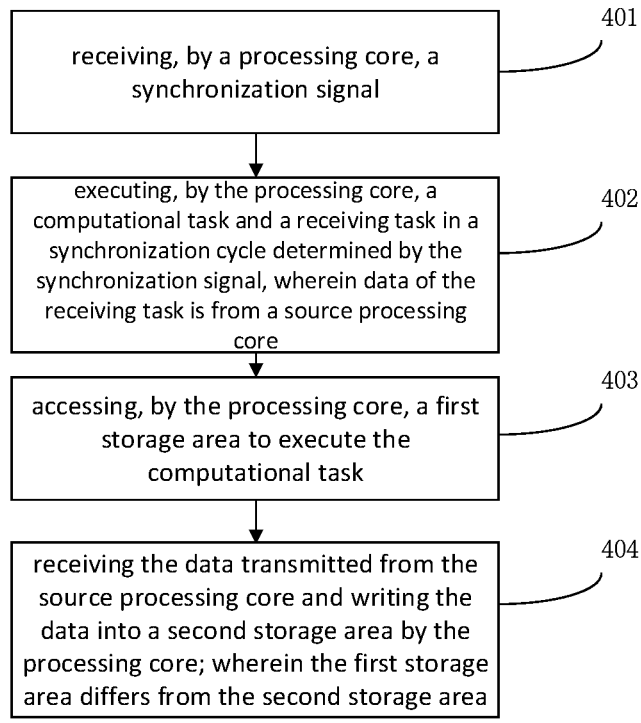
FIG. 4 is a schematic flowchart of another embodiment of a data processing method provided by the present disclosure.

FIG. 4 is a flowchart of another embodiment of a data processing method according to an embodiment of the present disclosure. The data processing method according to the embodiment may be executed by any one of the processing cores in a multi-core processor. Alternatively, the data processing method may be performed by a data processing apparatus. The data processing apparatus may be implemented as software, or implemented as a combination of software and hardware, and the data processing apparatus may be integrated in a certain device of a data processing system, such as in a data processing server or a data processing terminal device. As shown in FIG. 4, the method includes the following steps:

Step S401, a processing core receives a synchronization signal;

Step S402, the processing core executes a computational task and a receiving task in a synchronization cycle determined by the synchronization signal, wherein data of the receiving task is from a source processing core;

Step S403, the processing core accesses the first storage area to execute the computational task.

Step S404, the processing core receives the data transmitted from the source processing core and writes the data into a second storage area; wherein the first storage area differs from the second storage area.

Figure 5:
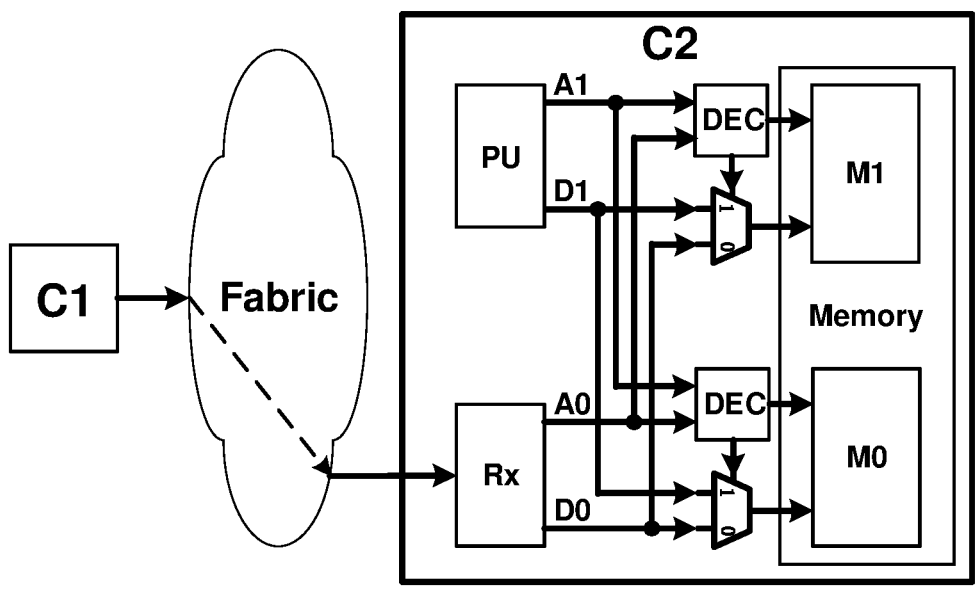
FIG. 5 is a schematic diagram of data exchange between processing cores in the data processing method provided by the present disclosure.

Using two processing cores as an example to describe the embodiment in detail. FIG. 5 shows an example of a processing core C2 in the embodiment. The processing core C2 includes a processing unit PU, used for performing a computational task; a receiving circuit Rx, used for executing a receiving task, wherein data of the receiving task is from a source processing core C1. In the first superstep determined by the current synchronization signal, the computational task of the processing core C2 is to access the storage area M1 and perform computation on the data in the storage area M1, and the receiving task is to receive the data of C1 and store the received data in the storage area M0.

As shown in FIG. 5, PU of the processing core C2 reads the data D1 from the storage area M1 via the address A1; the processing core C2 stores the received data D2 sent by C1 into the storage area M0 corresponding to the address A0.

Figure 6:
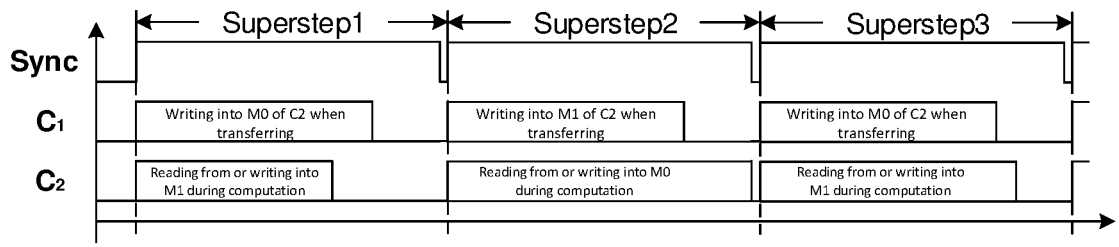
FIG. 6 is a task sequence diagram of data exchange between processing cores in the data processing method provided by the present disclosure.

FIG. 6 shows a part of a complete task. As shown in FIG. 6, in the first superstep (Superstep1), the computational task of C2 accesses M1, and the receiving task of C2 accesses M0; in the second superstep (Superstep2), the computational task of C2 accesses M0, and the receiving task accesses M1; in the third superstep (Superstep3), the computational task of C2 accesses M1, and the receiving task accesses M0. Since the data of the computational task of the current superstep is generally the data received by the receiving task in the previous superstep, the computational task and the receiving task are alternated between the two storage areas, which can improve the execution efficiency of the tasks without bringing data inconsistency problem. Similarly, the first storage area and the second storage area are two memories or two groups of memories that are physically independent of each other.

Optionally, the data of the receiving task in the step S402 is from a plurality of the source processing cores, and the processing core has a plurality of second storage areas corresponding to different source processing cores or a same source processing core.

In this optional embodiment, the processing core receives data sent by multiple source processing cores in the synchronization cycle determined by the synchronization signal, and each source processing core corresponds to a different second storage area in the processing core; the different second storage areas may be multiple second memories in the second storage area or multiple different storage spaces in the second storage area.

The embodiments of the present disclosure provide a data processing method, apparatus, electronic device and computer-readable storage medium. The data processing method includes: receiving, by a processing core, a synchronization signal; determining, by the processing core, according to the synchronization signal, a first storage area used by a self-task of the processing core and a second storage area used by a non-self-task of the processing core; wherein the first storage area differs from the second storage area; accessing the first storage area to execute the self-task and accessing the second storage area to execute the non-self-task by the processing core. Through the above method, the storage areas corresponding to different tasks of the processing core are separated, which solves the technical problems of complex data consistency processing mechanism and low processing efficiency caused by reading from and writing into the same storage area in the existing technology.

In the above paragraphs, although the steps in the above-mentioned method embodiments are described in the above-mentioned order, it should be clear to those skilled in the art that the steps in the embodiments of the present disclosure are not necessarily executed in the above-mentioned order, and may also be performed in other order, such as in reverse order, in parallel, interleavedly or the like; and on the basis of the above-mentioned steps, those skilled in the art may also add other steps. These obvious modifications or equivalent replacement modes should also be included within the protection scope of the present disclosure, and will not be repeated here.

Figure 7:
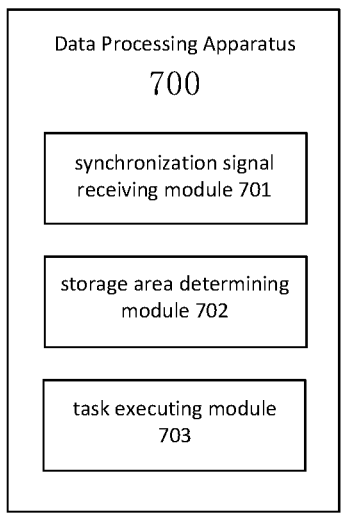
FIG. 7 is a schematic structural diagram of an embodiment of a data processing apparatus according to an embodiment of the present disclosure.

FIG. 7 is a schematic structural diagram of an embodiment of a data processing apparatus according to an embodiment of the present disclosure. As shown in FIG. 7, the apparatus 700 includes: a synchronization signal receiving module 701 (i.e., synchronization signal receiver), a storage area determining module 702 (i.e., storage area determiner) and a task executing module 703 (i.e., task executor). Among them, the synchronization signal receiving module 701 is for receiving a synchronization signal by a processing core;

the storage area determining module 702 is for determining, according to the synchronization signal, a first storage area used by a self-task of the processing core and a second storage area used by a non-self-task of the processing core by the processing core;

wherein the first storage area differs from the second storage area;

the task executing module 703 is for accessing the first storage area to execute the self-task and accessing the second storage area to execute the non-self-task by the processing core.

Further, the first storage area includes a plurality of first memories; the self-task includes a computational task and a sending task; and the computational task and the sending task use a same first memory, or the computational task and the sending task use different first memories.

Further, the self-task includes a plurality of the sending tasks, wherein each of the sending tasks corresponds to a different or same target processing core, and each of the sending tasks is marked with a storage area of the target processing core.

Further, the second storage area includes a plurality of second memories; the non-self-task includes at least one receiving task, wherein different receiving tasks use different second memories.

Further, different receiving tasks correspond to different source processing cores or a same source processing core.

Further, the data processing apparatus 700 further includes:

a configuration information receiving module (i.e., configuration information receiver) for receiving configuration information by the processing core, the configuration information including, in a synchronization cycle determined by each synchronization signal, a task of the processing core and a storage area corresponding to the task.

The apparatus shown in FIG. 7 may execute the method of the embodiment shown in FIG. 3. For parts not described in detail in this embodiment, reference may be made to the related description of the embodiment shown in FIG. 3. For the execution process and technical effect of this technical solution, reference may be made to the description of the embodiment shown in FIG. 3, which will not be repeated here.

Figure 8:
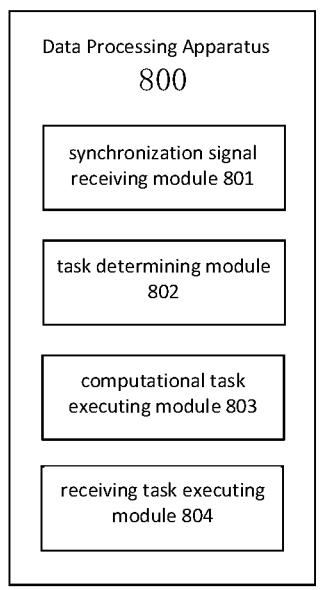
FIG. 8 is a schematic structural diagram of another embodiment of a data processing apparatus according to an embodiment of the present disclosure.

FIG. 8 is a schematic structural diagram of an embodiment of a data processing apparatus according to an embodiment of the present disclosure. As shown in FIG. 8, the apparatus 800 includes a synchronization signal receiving module 801 (i.e., synchronization signal receiver), a task determining module 802 (i.e., task determiner), a computational task executing module 803 (i.e., computational task executor), and a receiving task executing module 804 (i.e., receiving task executor). Among them, the synchronization signal receiving module 801 is for receiving a synchronization signal by a processing core;

the task determining module 802 is for executing a computational task and a receiving task by the processing core in a synchronization cycle determined by the synchronization signal, wherein data of the receiving task is from a source processing core;

the computational task executing module 803 is for accessing a first storage area to execute the computational task by the processing core;

the receiving task executing module 804 is for receiving the data transmitted from the source processing core and writing the data into a second storage area by the processing core;

wherein the first storage area differs from the second storage area.

Further, the data of the receiving task is from a plurality of the source processing cores, and the processing core has a plurality of second storage areas corresponding to different source processing cores or a same source processing core.

The apparatus shown in FIG. 8 may execute the method of the embodiments shown in FIG. 4 to FIG. 6. For parts not described in detail in this embodiment, reference may be made to the related description of the embodiments shown in FIG. 4 to FIG. 6. For the execution process and technical effect of this technical solution, reference may be made to the description of the embodiments shown in FIG. 4 to FIG. 6, which will not be repeated here.

Figure 9:
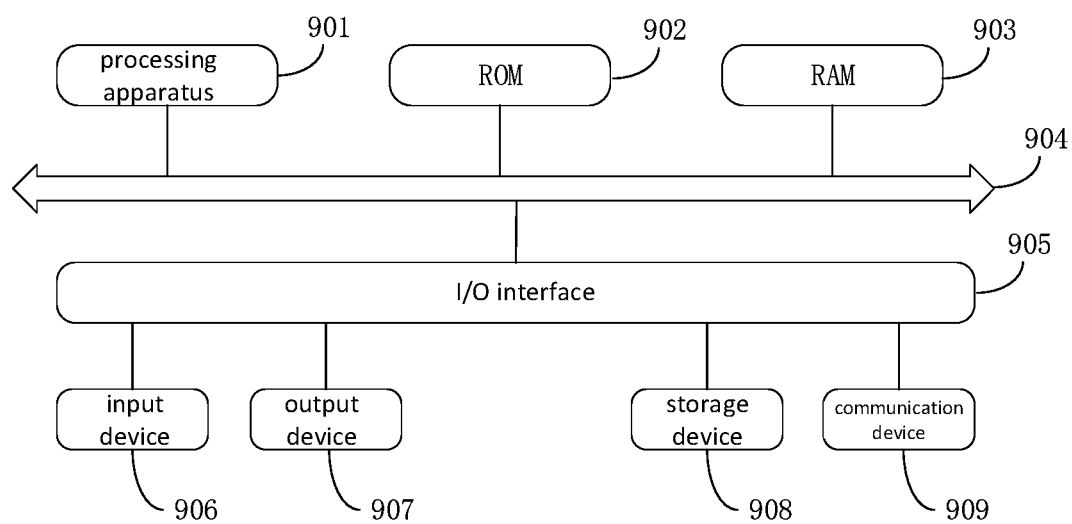
FIG. 9 is a schematic structural diagram of an electronic device according to an embodiment of the present disclosure.

Next, referring to FIG. 9, it shows a schematic structural diagram of an electronic device (e.g., a terminal device or a server in FIG. 1) 900 suitable for implementing an embodiment of the present disclosure. The terminal device in the embodiments of the present disclosure may include, but are not limited to, mobile terminals such as mobile phones, notebook computers, digital broadcast receivers, PDAs (Personal Digital Assistants), PADs (Tablets), PMPs (Portable Multimedia Players), vehicle-mounted terminals (e.g., in-vehicle navigation terminals) and the like, and fixed terminals such as digital TVs, desktop computers and the like. The electronic device shown in FIG. 9 is only an example, and should not impose any limitation on the function and scope of use of the embodiments of the present disclosure.

As shown in FIG. 9, the electronic device 900 may include a processing apparatus 901, which may perform various appropriate actions and processes according to programs stored in a read only memory (ROM) 902 or programs loaded into a random access memory (RAM) 903 from a storage device 908. In the RAM 903, various programs and data necessary for the operation of the electronic device 900 are also stored. The processing apparatus 901, the ROM 902, and the RAM 903 are connected to each other through a bus 904. An input/output (I/O) interface 905 is also connected to the bus 904. The processing apparatus includes one or more processors or processing cores.

In general, the following devices may be connected to the I/O interface 905: an input device 906 including, for example, a touch screen, touchpad, keyboard, mouse, camera, microphone, accelerometer, gyroscope and the like; an output device 907 including, for example, a liquid crystal display (LCD), speaker, vibrator and the like; a storage device 908 including, for example, a magnetic tape, hard disk and the like; and a communication device 909. The communication device 909 may allow the electronic device 900 to communicate wirelessly or by wire with other devices to exchange data. While FIG. 9 shows the electronic device 900 having various devices, it should be understood that not all of the illustrated devices are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program loaded on a non-transitory computer-readable medium, the computer program including program code for executing the method illustrated in the flowchart. In such an embodiment, the computer program may be downloaded and installed from the network via the communication device 909, or installed from the storage device 908, or installed from the ROM 902. When the computer program is executed by the processing apparatus 901, the above-mentioned functions defined in the methods of the embodiments of the present disclosure are executed.

It should be noted that the computer-readable medium mentioned above in the present disclosure may be a computer-readable signal medium or a computer-readable storage medium, or any combination of the above two. The computer-readable storage medium may include, but not limited to, an electronic, magnetic, optical, electromagnetic, infrared or semiconductor system, apparatus or device, or any combination of the foregoing. A more specific example of the computer-readable storage medium may include, but not limited to, an electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In the disclosure, the computer-readable storage medium may be any tangible medium that contains or stores a program, which may be used by or used in combination with an instruction execution system, apparatus or device. In the disclosure, the computer-readable signal medium may include a data signal with a computer-readable program code embodied therein propagated in a baseband or as part of a carrier wave. The propagated data signal may take a variety of forms, including but not limited to, an electromagnetic signal, optical signal or any suitable combination of the foregoing. The computer-readable signal medium may also include any computer-readable medium other than a computer-readable storage medium, and the computer-readable signal medium may send, propagate, or transmit a program used by or used in combination with the instruction execution system, apparatus, or device. The program code embodied on the computer-readable medium may be transmitted using any suitable medium including, but not limited to, an electrical wire, optical fiber cable, RF (radio frequency), etc., or any suitable combination of the foregoing.

In some embodiments, the client and the server may use any currently known or future developed network protocol such as HTTP (HyperText Transfer Protocol) to communicate, and may be interconnected with digital data communication in any form or medium (e.g., communication network). Examples of communication networks include local area networks ("LAN"), wide area networks ("WAN"), the Internet networks (e.g., the Internet), and peer-to-peer networks (e.g., ad hoc peer-to-peer networks), as well as any currently known or future developed network.

The computer-readable medium may be included in the above-mentioned electronic device, or may be provided independently without being assembled into the electronic device.

The computer-readable medium may carry one or more programs, which, upon execution by the electronic device, cause the electronic device to: receive, by a processing core, a synchronization signal; determine, by the processing core, according to the synchronization signal, a first storage area used by a self-task of the processing core and a second storage area used by a non-self-task of the processing core; wherein the first storage area differs from the second storage area; access the first storage area to execute the self-task and access the second storage area to execute the non-self-task by the processing core.

Computer program code for performing operations of the present disclosure may be written in one or more programming languages or combinations thereof, the programming languages including but not limited to object-oriented programming languages, such as Java, Smalltalk, C++, and conventional procedural programming languages, such as the "C" language or similar programming languages. The program code may be executed completely on a user's computer, partially on the user's computer, as a separate software package, partially on the user's computer and partially on a remote computer, or completely on the remote computer or server. In the case of a remote computer, the remote computer may be connected to the user's computer through any kind of network, including a local area network (LAN) or wide area network (WAN), or may be connected to an external computer (e.g., using an Internet service provider to connect through Internet).

The flowcharts and block diagrams in the accompanying drawings show the possible architecture, functions, and operations of systems, methods, and computer program products according to various embodiments of the present disclosure. In this regard, each block in the flowcharts or block diagrams may represent a module, a program segment or a part of codes, and the module, the program segment or the part of the codes contains one or more executable instructions for implementing the defined logical functions. It should also be noted that in some implementations as alternatives, the functions labeled in the blocks may occur in an order different from the order labeled in the accompanying drawings. For example, two sequentially shown blocks may be substantially executed in parallel in fact, and they sometimes may also be executed in a reverse order, depending on related functions. It should also be noted that each block in the block diagrams and/or the flowcharts and the combination of the blocks in the block diagrams and/or the flowcharts may be implemented by a dedicated system based on hardware for executing defined functions or operations, or may be implemented by a combination of the dedicated hardware and computer instructions.

The units described in the embodiments of the present disclosure may be implemented in a software fashion or may be implemented in a hardware fashion. The names of the units do not constitute a limitation to the units in some cases.

The functions described above herein may be performed, at least in part, by one or more hardware logic components. For example, non-restrictively, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program for use by or in conjunction with an instruction execution system, apparatus or device. The machine-readable medium may be a machine-readable signal medium or a machine-readable storage medium. The machine-readable medium may include, but not limited to, an electronic, magnetic, optical, electromagnetic, infrared or semiconductor system, apparatus or device, or any suitable combination of the foregoing. A more specific example of the machine-readable storage medium includes an electrical connection based on one or more wires, a portable computer disk, a hard disk, a random-access memory (RAM), a read-only memory (ROM), an erasable programmable read-only memory (an EPROM or a flash memory), an optical fiber, a portable compact disk read-only memory (CD-ROM), an optical storage device, a magnetic storage device, or any suitable combination of the above content.

The foregoing description is only the description of preferred embodiments of the present disclosure and the used technical principle. A person skilled in the art should understand that the scope of the present disclosure in the present disclosure is not limited to a technical solution formed by a specific combination of the technical features. In addition, other technical solutions formed by any combination of the foregoing technical features or equivalent features thereof shall be encompassed without departing from the concept of the present disclosure. For example, the technical solutions formed by mutual replacement between the foregoing features and the technical features having similar functions (however, the technical features are not limited thereto) disclosed in the present disclosure shall be encompassed.

The invention claimed is:

1. A data processing method applied in a multi-core structure system using a bulk synchronous parallel synchronization mechanism and including a synchronization signal generator and a plurality of processing cores, comprising:
   receiving, by each processing core, a synchronization signal from the synchronization signal generator;
   determining, by each processing core, a first storage area and a second storage area in the processing core according to a sequence number or a parameter of the synchronization signal;
   accessing, by each processing core, the first storage area to obtain computational data, and executing, by each processing core, a computational task corresponding to the synchronization signal on the computational data;
   receiving, by each processing core, input data from one or more processing cores of the plurality of processing cores and writing the received input data into the second storage area; and
   accessing, by each processing core, the first storage area to obtain output data, and sending the output data to one or more processing cores of the plurality of processing cores,
   wherein, in each processing core, the first storage area differs from the second storage area,
   wherein the plurality of processing cores are synchronized by the synchronization signal.

2. The data processing method according to claim 1, wherein
   each processing core includes a processing unit, used for performing the computational task.

3. The data processing method according to claim 2, wherein
   each processing unit obtains, according to an address in the computational task, the computational data from the first storage area.

4. The data processing method according to claim 1, wherein
   each processing core includes a receiving circuit, used for executing the receiving task.

* * * * *